No. 808,976. PATENTED JAN. 2, 1906.
T. B. DORNAN.
WOVEN FABRIC.
APPLICATION FILED JAN. 12, 1905.
2 SHEETS—SHEET 1.
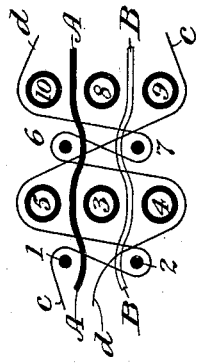
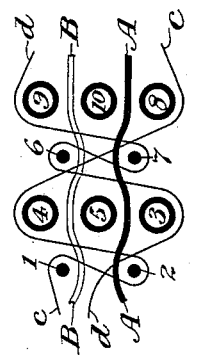
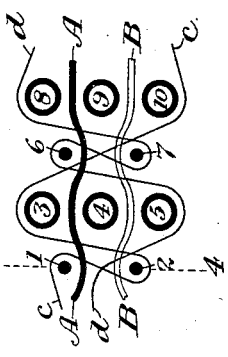
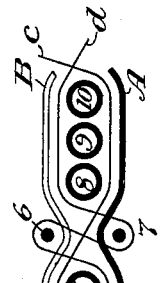
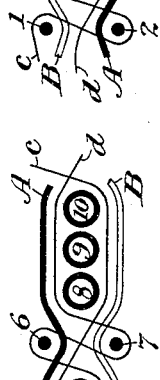
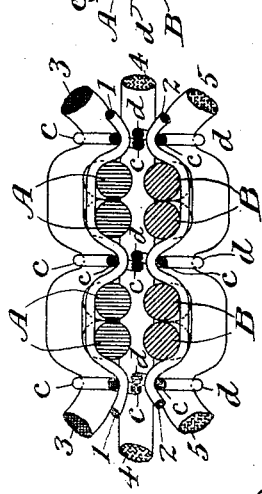
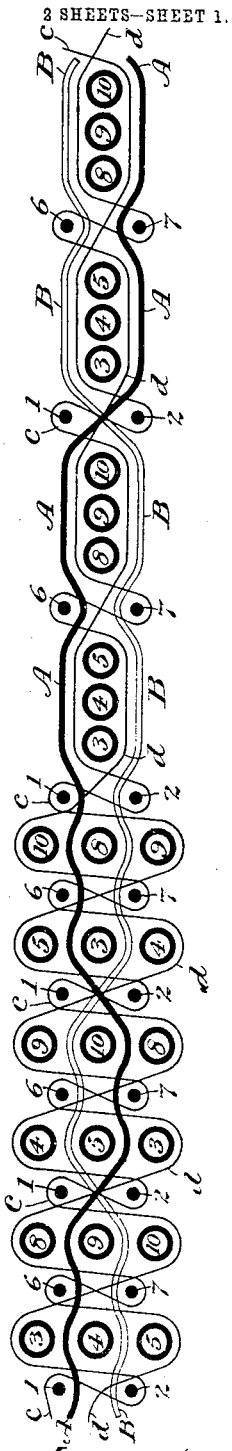
Witnesses
Albert V. Day
Henry Barnes
Inventor:
Thomas Benton Dornan
by Henry D. Williams
Atty.

No. 808,976. PATENTED JAN. 2, 1906.
T. B. DORNAN.
WOVEN FABRIC.
APPLICATION FILED JAN. 12, 1905.
2 SHEETS—SHEET 2.
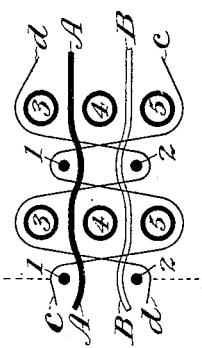
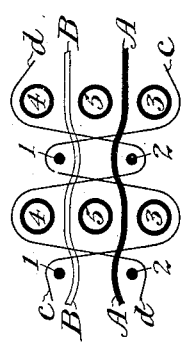
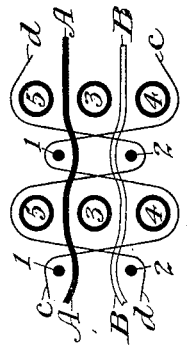
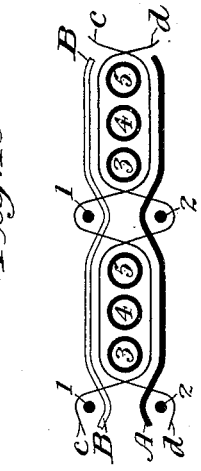
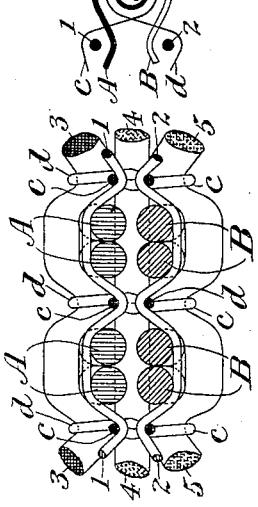
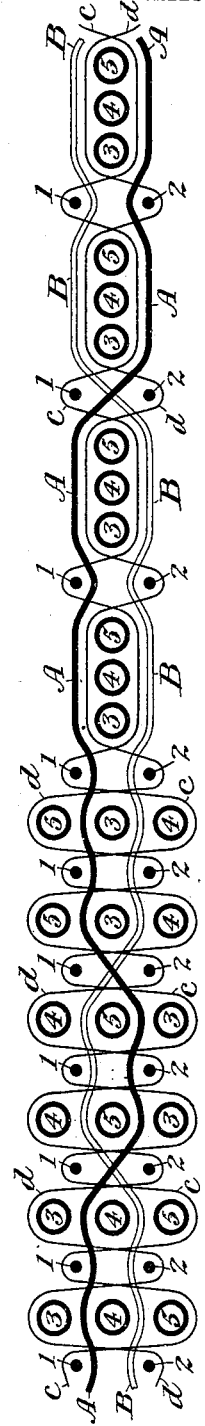
Witnesses:
Albt T Day
Henry Barnes
Inventor:
Thomas Benton Dornan
by Henry D. Williams
Atty.

UNITED STATES PATENT OFFICE.

THOMAS BENTON DORNAN, OF PHILADELPHIA, PENNSYLVANIA.

WOVEN FABRIC.

No. 808,976.  Specification of Letters Patent.  Patented Jan. 2, 1906.

Application filed January 12, 1905. Serial No. 240,724.

*To all whom it may concern:*

Be it known that I, THOMAS BENTON DORNAN, a citizen of the United States, residing at Philadelphia, in the county of Philadelphia and State of Pennsylvania, have invented certain new and useful Improvements in Woven Fabrics, of which the following is a specification, reference being had therein to the accompanying drawings, forming a part thereof.

My invention relates to woven fabrics such as are used for carpets and rugs, and more particularly to that class of such fabrics in which the pattern and color effects are produced by figuring weft-threads and figuring warp-threads associated with suitable binder-threads.

My invention has for its objects compactness of structure and tight weaving, with consequent durability and strength; a looping of surface threads and deep indentation of the fabric, so as to produce a pile-like appearance; reversibility of the fabric; considerable body and thickness, with economy in weaving, purity of color effects, and embossed or pile-like appearance, and the attainment of a considerable number and variety of colors and contrasting varieties of structural appearance and particularly of a large number of solid color effects.

Other objects of my invention will appear from the following description of the carpet fabrics shown in the accompanying drawings and embodying my invention.

I will now describe such fabrics and will thereafter point out my invention in claims. Figures 1, 2, 3, 5, and 6 are diagrammatical longitudinal sections, or sections taken on planes parallel to the warp-threads and at right angles to the weft-threads of portions of the fabric, each view showing one set of weft-threads and the different views showing the different arrangements of the threads for the five solid color effects on each surface attainable in one fabric with one sequence of threads. Fig. 4 is a transverse section of a portion of the fabric on a plane indicated by the line 4 4, Fig. 1. Fig. 7 is a diagrammatical longitudinal section showing consecutively the five arrangements of threads which are separately illustrated in Figs. 1 to 6, inclusive. Figs. 8, 9, 10, 12, and 13 are diagrammatical longitudinal sections of portions of a different construction of fabric embodying several features of my invention, each view showing two consecutive sets and the different views showing different arrangements of the threads for the five solid color effects on each surface attainable in one fabric with one sequence of threads. Fig. 11 is a transverse section of the fabric on a plane indicated by the line 11 11, Fig. 8. Fig. 14 is a diagrammatical longitudinal section showing consecutively the five arrangements of threads which are separately illustrated in Figs. 8 to 13, inclusive.

In Figs. 1, 2, 3, 5 to 10, inclusive, and 12, 13, and 14 the threads shown in cross-section are exaggerated in size relatively to the threads longitudinally shown, and the threads longitudinally shown are vertically separated for clearness of illustration. In Figs. 4 and 11 the threads are shown of their approximate relative sizes and in their approximate relative positions.

The fabric, as shown in Figs. 1 to 7, inclusive, is provided with binder weft-threads and figuring weft-threads in sets of ten weft-threads each, each set comprising in succession two binder weft-threads 1 and 2, three figuring weft-threads 3, 4, and 5, two binder weft-threads 6 and 7, and three figuring weft-threads 8, 9, and 10. Where solid color effects are desirable, the two figuring weft-threads 3 and 8 will both be of the same color, the two figuring weft-threads 4 and 9 will both be of the same color, and the two figuring weft-threads 5 and 10 will both be of the same color. Assuming such a disposition of colors, the figuring weft-threads 3 and 8 may be black, the figuring weft-threads 4 and 9 may be écru, and the figuring weft-threads 5 and 10 may be tan. The binder weft-threads contribute to the color effects only in that they form transverse lines between the surface-ply figuring-threads; but as such transverse lines they replace the shadows which usually appear between transverse lines of pile-loops of a Brussels fabric, and it is therefore usually desirable that they should be of a dark color, and black is frequently a desirable color for these threads. We may assume, therefore, that all the binder weft-threads are black. As, however, the binder weft-threads may be maintained always in the same ply throughout a fabric, they may be differently colored to harmonize with the prevailing color effects at the face and the back of the fabric.

The fabric is provided with binder warp-threads and figuring warp-threads. We may assume that the figuring warp-thread A is red and that the figuring warp-thread B is green. The binder warp-threads $c$ and $d$ merely form thin longitudinal lines between the figuring-threads, and we may assume that they are black. They repeatedly pass from surface ply to surface ply throughout the fabric.

The sequence of the weft-threads is indicated by their numbers. The arrangement of warp-threads is shown in Fig. 4. The arrangement shown would provide in each dent of the reed in succession a figuring warp-thread A, a figuring warp-thread B, two binder warp-threads $c$ and $d$, a figuring warp-thread A, and a figuring warp-thread B. This enables the figuring warp-threads to be brought to the surface in pairs of the same color, the several pairs of figuring warp-threads on each surface being separated by binder warp-threads. In the weaving of the fabric shown the binder warp-threads may be controlled by journals or heddles. The lifts of the binder warp-threads are the same throughout the fabric and are as follows: first shot, binder $c$ up; second shot, binder $d$ up; third shot, binder $c$ up; fourth shot, binder $d$ up; fifth shot, binder $c$ up; sixth shot, binder $d$ up; seventh shot, binder $c$ up; eighth shot, binder $d$ up; ninth shot, binder $d$ up; tenth shot, binder $d$ up. The figuring warp-threads are preferably controlled by jacquard mechanism for selecting and lifting the threads to produce the desired pattern and color effects.

In the weaving of the color effect shown in Figs. 1 and 4, which is a weft effect and would be solid black on the face and solid tan on the back with the colors above mentioned, the lifting of the binder warp-threads would be as above stated, the binder warp-thread $c$ being up and the binder warp-thread $d$ and the figuring warp-threads A and B down for the first shot, the binder-warp $d$ and the figuring-warps A and B up and the binder-warp $c$ down for the second shot, the binder-warp $c$ up and the binder-warp $d$ and the figuring-warps A and B down for the third shot; the binder-warp $c$ and the figuring-warp A up and the binder-warp $d$ and the figuring-warp B down for the fourth shot, the binder-warp $c$ and the figuring-warps A and B up and the binder-warp $d$ down for the fifth shot, the binder-warp $d$ up and the binder warp-thread $c$ and the figuring warp-threads A and B down for the sixth shot, the binder-warp $c$ and the figuring-warps A and B up and the binder-warp $d$ down for the seventh shot, the binder-warp $d$ up and the binder-warp $c$ and the figuring-warps A and B down for the eighth shot, the binder-warp $d$ and the figuring-warp A up and the binder-warp $c$ and the figuring-warp B down for the ninth shot; the binder-warp $d$ and the figuring-warps A and B up and the binder-warp $c$ down for the tenth shot. This completes one set or unit of weaving and is exactly repeated in the following sets of the same color effect. In the weaving of the fabric with this operation of the warp-threads the binder warp-thread $c$ is woven first over the upper binder weft-thread 1 and then down through the fabric and backward and under the lower binder weft-thread 2 and then up through the fabric and over the upper figuring-weft 3. The binder warp-thread $d$ is woven first under the upper binder weft-thread 1 and over the lower binder weft-thread 2 and through the fabric and under the lower figuring weft-thread 5. The binder warp-thread $d$ then passes up through the fabric and over the upper binder weft-thread 6 and then down and backward through the fabric under the lower binder weft-thread 7 and then up again through the fabric and over the upper figuring weft-thread 8, and the binder warp-thread $c$ after passing over the upper figuring weft-thread 3 passes through the fabric under the upper binder weft-thread 6 and over the lower binder weft-thread 7 and under the lower figuring weft-thread 10. Thus in each set the binder warp-thread $c$ binds the weft-threads 1, 2, 3, and 10, and the binder weft-thread $d$ binds the weft-threads 5, 6, 7, and 8, and each binder warp-thread in passing from figuring weft-thread to figuring weft-thread passes easily through the fabric, as from the weft-thread 3 to the weft-thread 10, while in passing from binder weft-thread to binder weft-thread it passes tightly and somewhat backwardly through the fabric, as from the weft-thread 1 to the weft-thread 2 or from the weft-thread 6 to the weft-thread 7. In the fabric thus woven the binder weft-threads 1 and 6 will be in an upper plane and the binder weft-threads 2 and 7 will be in a lower plane, the binder weft-thread 1 over the binder weft-thread 2, and the binder weft-thread 6 over the binder weft-thread 7, and at the portions of the fabric where these binder weft-threads are located the fabric will contain weft-threads in two planes only. The figuring weft-threads 3 and 8 will be in an upper plane, the figuring weft-threads 4 and 9 in a middle or intermediate plane, and the figuring weft-threads 5 and 10 in a lower plane, the figuring weft-threads 3, 4, and 5 being substantially in vertical alinement and the figuring weft-threads 8, 9, and 10 being substantially in vertical alinement and the fabric at these portions containing weft-threads in three planes. It will be noted that the outer planes in which the upper and lower figuring weft-threads are located are more widely separated than the outer planes in which the upper and lower binder weft-threads are located. By reason of the fact that there are no weft-threads between the upper and the lower binder weft-threads these binder weft-threads will be permitted to approach quite closely together, and they will be drawn together by the very tight binding of these threads, so that the portion of the fabric at which they are located will be comparatively thin and in marked contrast with the adjacent portions of the fabric wherein three superposed figuring weft-threads will contribute to a considerable thickness of fabric with consequent considerable projection above and below the adjacent thinner portion of the fabric. The fabric will therefore have a deeply-indented or Brussels-like appearance as a whole, and this deep indenting will be very marked as regards the transverse lines which correspond to the hollows between the rows of pile-loops appearing in a Brussels fabric. The figuring warp-threads A and B are buried within the fabric in this color effect (shown in Figs. 1 and 4) and fill out the loops of the figuring weft-threads, as clearly shown in Fig. 4. The binder weft-threads are also looped over these figuring warp-threads and conceal them in the spaces between the figuring weft-threads, while the binder warp-threads are also to some extent looped by the weft-threads over the intermediate figuring weft-threads 4 and 9. The fabric is tightly bound together about each surface thread from ply to ply and the binder-threads are so deeply indented that the wearing-surface consists of the heavy figuring weft-threads, as is highly desirable, and, moreover, these heavy figuring-threads at the portions exposed to wear are effectively cushioned by the inner threads, so that they will be soft to the tread and well adapted to sustain the pressure, abrasion, and hard usage to which carpets are subjected. In fact, in this color effect at each point of exposure of the figuring weft-threads there will be five layers of heavy threads. This is equally true in each of the three color effects shown in Figs. 1 to 4, inclusive.

The color effect shown in Fig. 2 with the colors of figuring-wefts above mentioned would be solid black at the face and solid tan at the back of the fabric. As in the color effect or arrangement shown in Figs. 1 and 4, this color effect is produced by the figuring weft-threads. The operation of the binder warp-threads in this, as in all other arrangements throughout the fabric, is the same as already described, and the different disposition of figuring weft-threads results from the operation of the figuring warp-threads. The first and second and the sixth and seventh shots also remain unchanged throughout the fabric. For the third shot both figuring-warps A and B are up. For the fourth shot both figuring-warps A and B are down. For the fifth shot the figuring-warp B is up and the figuring-warp A down. As to the operation of the figuring-warps, the eighth shot is the same as the third, the ninth the same as the fourth, and the tenth the same as the fifth.

In the arrangement shown in Fig. 3 the color effect with the colors of figuring-wefts above mentioned is solid tan at the face and solid écru at the back. Here the figuring-warp A is up and the figuring-warp B is down for the third shot, both figuring-warps A and B are up for the fourth shot, and both figuring-warps A and B are down for the fifth shot, and this succession of operations of the figuring-warps is repeated for the eighth, ninth, and tenth shots.

Figs. 5 and 6 show the two solid-color warp effects. With the colors of figuring-warp-threads above mentioned the effect in Fig. 5 would be solid red on the face and solid green on the back, while the effect in Fig. 6 would be solid green on the face and solid red on the back. In the weaving of these effects the disposition of the warp-threads for the first and second and for the sixth and seventh shots is the same as above described relative to the effects shown in Figs. 1 and 4. In the third shot the figuring-warp A is up and the binder $c$ is up and the figuring-warp B and the binder $d$ are down. For the fourth and fifth shots the shed is unchanged. For the eighth, ninth, and tenth shots the figuring-warp A and the binder-warp $d$ are up and the figuring-warp B and the binder-warp $c$ are down. Thus the figuring weft-threads go to the middle of the fabric and are arranged three in a loop and being side by side without intervening threads are beaten up closely together with vertical distention, so that they form a compact cushioning mass over which the surface figuring warp-threads are looped. The fabric at the portions containing these figuring-weft-threads has all of its weft-threads in a single plane; but the figuring weft-threads are so massed that they effectively act as stuffers and cushion the surface figuring warp-threads, and the fabric is soft to the tread, with only the figuring warp-threads exposed to wear and effectively cushioned at the points of wear.

The several effects above described are successively arranged in the portion of the fabric shown in Fig. 7, and with the colors above mentioned the several color effects here shown, commencing from the left, would be as follows: on the face, solid black, solid écru, solid tan, solid red, and solid green; on the back, solid tan, solid black, solid écru, solid green, and solid red. It will be seen in this drawing that the fabric contains in part its weft-threads arranged in one plane, in other parts its weft-threads arranged in two planes, and in other parts its weft-threads arranged in three planes, as above pointed out in describing the several color effects. It will also be noted that this fabric has the five solid color effects which characterize a five-frame Brussels fabric, and by reason of the looped condition of its surface threads it is well adapted as a substitute for such a Brussels fabric and has, moreover, the added advantage of reversibility and of more compact construction, all surface looped threads having their loops supported by inner threads.

In the construction of fabric shown in Fig. 8 to 14, inclusive, the same arrangement of weft-threads is employed, but the binder warp-threads pass directly from ply to ply in the well-known manner. The lifts of the binder warp-threads are the same throughout the fabric and are as follows: first shot, binder $c$ up; second shot, binder $c$ up; third shot, binder $d$ up; fourth shot, binder $d$ up; fifth shot, binder $d$ up. The sixth shot is the same as the first, and so on. The lifts are repeated every fifth shot and the fabric has its weft-threads arranged in sets of five weft-threads each. The operation of the figuring-warps would be exactly the same as above described relative to Figs. 1 to 7, inclusive. The color effects shown in Figs. 8 and 11 are the same as in Figs. 1 and 4, that in Fig. 9 the same as in Fig. 2, that in Fig. 10 the same as in Fig. 3, that in Fig. 12 the same as in Fig. 5, and that in Fig. 13 the same as in Fig. 6. The several color effects in Fig. 14 correspond to those in Fig. 7.

It is obvious that various other alterations may be made in the constructions shown and above particularly described within the principles and scope of my invention.

What I claim, and desire to secure by Letters Patent, is—

1. A woven fabric having figuring weft-threads arranged in one plane in portions of the fabric and arranged in three planes in other portions of the fabric.

2. A woven fabric having figuring weft-threads arranged in one plane in portions of the fabric and arranged in three planes in other portions of the fabric and having warp-threads tying the weft-threads together from surface plane to surface plane at each side of each surface weft-thread at all portions where the figuring weft-threads are arranged in three planes.

3. A woven fabric having figuring warp-threads and figuring weft-threads, the figuring weft-threads being arranged in one plane in portions of the fabric and arranged in three planes in other portions of the fabric.

4. A woven fabric having binder warp-threads and figuring warp-threads and figuring weft-threads, the figuring weft-threads being arranged in one plane in portions of the fabric and arranged in three planes in other portions of the fabric.

5. A woven fabric having binder warp-threads and figuring warp-threads and figuring weft-threads, the figuring weft-threads being arranged in one plane in portions of the fabric and in three planes in other portions of the fabric, and the binder warp-threads tying the weft-threads together from surface plane to surface plane at each side of each weft-thread at all portions where the figuring weft-threads are arranged in three planes.

6. A woven fabric having figuring weft-threads arranged in one plane in portions of the fabric and arranged in three planes in other portions of the fabric, and also having weft-threads arranged in two planes in other portions of the fabric.

7. A woven fabric having figuring weft-threads arranged in one plane in portions of the fabric and arranged in three planes in other portions of the fabric and also having weft-threads arranged in two planes in other portions of the fabric and having warp-threads tying the weft-threads together from surface plane to surface plane at each side of each surface weft-thread at portions where the weft-threads are arranged in two planes and three planes.

8. A woven fabric having figuring warp-threads and binder warp-threads and having figuring weft-threads arranged in one plane in portions of the fabric and arranged in three planes in other portions of the fabric and also having weft-threads arranged in two planes in other portions of the fabric.

9. A woven fabric having figuring warp-threads and binder warp-threads and having figuring weft-threads arranged in one plane in portions of the fabric and arranged in three planes in other portions of the fabric and also having weft-threads arranged in two planes in other portions of the fabric, the binder warp-threads tying the weft-threads together from surface plane to surface plane at each side of each surface weft-thread at all portions where the weft-threads are arranged in two planes and three planes.

10. A woven fabric having figuring weft-threads and binder weft-threads, the figuring weft-threads being arranged in one plane in portions of the fabric and in three planes in other portions of the fabric, and the binder weft-threads being arranged in two planes.

11. A woven fabric having figuring weft-threads and binder weft-threads, the figuring weft-threads being arranged in one plane in portions of the fabric and in three planes in other portions of the fabric, and the binder weft-threads being arranged in two planes, and having warp-threads tying the weft-threads together from surface plane to surface plane at each side of each surface weft-thread at all portions where the weft-threads are arranged in two planes and three planes.

12. A woven fabric having figuring warp-threads and figuring weft-threads and binder weft-threads, the figuring weft-threads being arranged in one plane in portions of the fabric and in three planes in other portions of the fabric, and the binder weft-threads being arranged in two planes.

13. A woven fabric having figuring warp-threads and binder warp-threads and figuring weft-threads and binder weft-threads, the figuring weft-threads being arranged in one plane in portions of the fabric and in three planes in other portions of the fabric, and the binder weft-threads being arranged in two planes, and the binder warp-threads tying the weft-threads together from surface plane to surface plane at each side of each surface weft-thread at all portions where the weft-threads are arranged in two planes and three planes.

14. A woven fabric having figuring warp-threads and binder warp-threads and figuring weft-threads and binder weft-threads, the figuring weft-threads being arranged in one plane in portions of the fabric and arranged in three planes in other portions of the fabric and the figuring warp-threads acting as stuffers between the surface figuring weft-threads and intermediate figuring weft-threads, and the figuring weft-threads acting as stuffers between the surface figuring warp-threads.

15. A woven fabric having figuring warp-threads and binder warp-threads and figuring weft-threads and binder weft-threads, the figuring weft-threads being arranged in one plane in portions of the fabric and in three planes in other portions of the fabric, and the binder weft-threads being arranged in two planes and the figuring warp-threads acting as stuffers between the surface figuring weft-threads and intermediate figuring weft-threads, and the figuring weft-threads acting as stuffers between the surface figuring warp-threads.

16. A woven fabric having figuring warp-threads and binder warp-threads and figuring weft-threads and binder weft-threads, the figuring weft-threads being arranged in one plane in portions of the fabric and arranged in three planes in other portions of the fabric, the binder warp-threads tying the weft-threads together from surface plane to surface plane at each side of each surface weft-thread at all portions where the weft-threads are arranged in two planes and three planes, and the figuring warp-threads acting as stuffers between the surface figuring weft-threads and intermediate figuring weft-threads, and the figuring weft-threads acting as stuffers between the surface figuring warp-threads.

17. A woven fabric having figuring warp-threads and binder warp-threads and figuring weft-threads and binder weft-threads, the figuring weft-threads being arranged in one plane in portions of the fabric and in three planes in other portions of the fabric, and the binder weft-threads being arranged in two planes, the binder warp-threads tying the weft-threads together from surface plane to surface plane at each side of each surface weft-thread at all portions where the weft-threads are arranged in two planes and three planes and the figuring warp-threads acting as stuffers between the surface figuring weft-threads and intermediate figuring weft-threads, and the figuring weft-threads acting as stuffers between the surface figuring warp-threads.

18. A woven fabric having figuring weft-threads and binder weft-threads and figuring warp-threads and binder warp-threads, the binder warp-threads binding the figuring weft-threads with three figuring weft-threads in a loop of binder warp-threads.

19. A woven fabric having figuring weft-threads and binder weft-threads and figuring warp-threads and binder warp-threads, the binder warp-threads binding the figuring weft-threads with a plurality of figuring weft-threads in a loop of binder warp-threads, and each of such loops in the weft effects including a figuring weft-thread at each surface of the fabric and a figuring weft-thread between the two surface weft-threads.

20. A woven fabric having figuring weft-threads and binder weft-threads and figuring warp-threads and binder warp-threads, the binder warp-threads binding the figuring weft-threads with three figuring weft-threads in a loop of binder warp-threads and each of such loops in warp effects having the figuring weft-threads arranged in one plane.

21. A woven fabric having figuring weft-threads and binder weft-threads and figuring warp-threads and binder warp-threads, the binder warp-threads binding the figuring weft-threads with a plurality of figuring weft-threads in each loop of binder warp-threads, each of such loops in the weft effects including a figuring weft-thread at each surface of the fabric and a figuring weft-thread between the two surface weft-threads and each of such loops in warp effects having the figuring weft-threads arranged in one plane.

22. A woven fabric having figuring weft-threads and binder weft-threads and figuring warp-threads and binder warp-threads, the binder warp-threads binding the figuring weft-threads with a plurality of figuring weft-threads in a loop of binder warp-threads, each of such loops in the weft effects including a figuring weft-thread at each surface of the fabric and a figuring weft-thread between the two surface weft-threads, the figuring warp-threads acting as stuffers between the surface figuring weft-threads and intermediate figuring weft-threads, and the adjacent figuring weft-threads acting as stuffers between the surface figuring warp-threads.

23. A woven fabric having three figuring weft-threads and binder weft-threads and two figuring warp-threads and binder warp-threads, the binder warp-threads binding the figuring weft-threads with three figuring weft-threads in a loop of binder warp-threads, each of such loops in warp effects having the figuring weft-threads arranged in one plane, the figuring warp-threads acting as stuffers between the surface figuring weft-threads and intermediate figuring weft-threads and the figuring weft-threads acting as stuffers between the surface figuring warp-threads.

24. A woven fabric having figuring weft-threads and binder weft-threads and figuring warp-threads and binder warp-threads, the binder warp-threads binding the figuring weft-threads with a plurality of figuring weft-threads in each loop of binder warp-threads, each of such loops in the weft effects including a figuring weft-thread at each surface of the fabric and a figuring weft-thread between the two surface weft-threads and each of such loops in warp effects having the figuring weft-threads arranged in one plane, the figuring warp-threads acting as stuffers between the surface figuring weft-threads and intermediate figuring weft-threads and the figuring weft-threads acting as stuffers between the surface figuring warp-threads.

25. A woven fabric having figuring weft-threads and binder weft-threads and figuring warp-threads and binder warp-threads, the binder warp-threads binding the binder weft-threads with a single binder weft-thread in a loop of binder warp-threads and binding the figuring weft-threads with a plurality of figuring weft-threads in a loop of binder warp-threads, each of such loops which contains figuring weft-threads including, in the weft effects, a figuring weft-thread at each surface of the fabric and a figuring weft-thread between the two surface weft-threads.

26. A woven fabric having figuring weft-threads and binder weft-threads and figuring warp-threads and binder warp-threads, the binder warp-threads binding the binder weft-threads with a single binder weft-thread in a loop of binder warp-threads and binding the figuring weft-threads with three figuring weft-threads in a loop of binder warp-threads, each of such loops which contains figuring weft-threads having, in the warp effects, the figuring weft-threads arranged in one plane.

27. A woven fabric having figuring weft-threads and binder weft-threads and figuring warp-threads and binder warp-threads, the binder warp-threads binding the binder weft-threads with a single binder weft-thread in a loop of binder warp-threads and binding the figuring weft-threads with a plurality of figuring weft-threads in a loop of binder warp-threads, each of such loops which contains figuring weft-threads including, in weft effects, a figuring weft-thread at each surface of the fabric and a figuring weft-thread between the two surface weft-threads, and having, in warp effects, the figuring weft-threads arranged in one plane.

28. A woven fabric having figuring weft-threads and binder weft-threads and figuring warp-threads and binder warp-threads, the weft-threads being arranged in sets of ten weft-threads each, each set comprising, in succession, two binder weft-threads, three figuring weft-threads, two binder weft-threads and three figuring weft-threads, the binder warp-threads being arranged in two sets and binding the figuring weft-threads with three figuring weft-threads in a loop of binder warp-threads.

29. A woven fabric having figuring weft-threads and binder weft-threads and binder warp-threads, the weft-threads being arranged in sets of ten weft-threads each, six figuring weft-threads and four binder weft-threads in each set, the binder warp-threads binding the figuring weft-threads with three figuring weft-threads in a loop of binder warp-threads.

30. A woven fabric having figuring weft-threads and binder weft-threads and binder warp-threads, the weft-threads being arranged in sets of ten weft-threads each, six figuring weft-threads and four binder weft-threads in each set, the binder warp-threads binding the binder weft-threads with a single binder weft-thread in a loop of binder warp-threads and binding the figuring weft-threads with three figuring weft-threads in a loop of binder warp-threads.

31. A woven fabric having figuring weft-threads and binder weft-threads and figuring warp-threads and binder warp-threads, the weft-threads being arranged in sets of ten weft-threads each, each set comprising, in succession, two binder weft-threads, three figuring weft-threads, two binder weft-threads and three figuring weft-threads, the binder warp-threads being arranged in two sets and binding the binder weft-threads with a single binder weft-thread in a loop of binder warp-threads and binding the figuring weft-threads with three figuring weft-threads in a loop of binder warp-threads.

32. A woven fabric having figuring weft-threads and binder weft-threads and figuring warp-threads and binder warp-threads, the weft-threads being arranged in sets of ten weft-threads each, each set comprising, in succession, two binder weft-threads, three figuring weft-threads, two binder weft-threads and three figuring weft-threads, the figuring warp-threads being arranged in two sets and the binder warp-threads being arranged in two sets and binding the binder weft-threads with a single binder weft-thread in a loop of binder warp-threads and binding the figuring weft-threads with three figuring weft-threads in a loop of binder warp-threads, the figuring warp-threads acting as stuffers between the surface figuring weft-threads and the intermediate figuring weft-threads and the figuring weft-threads acting as stuffers between the surface figuring warp-threads, substantially as set forth.

In testimony whereof I have affixed my signature in presence of two witnesses.

THOMAS BENTON DORNAN.

Witnesses:
WILLIAM F. LARER,
JAMES H. AVERY.